United States Patent
Jeong et al.

(10) Patent No.: US 8,694,773 B2
(45) Date of Patent: *Apr. 8, 2014

(54) METHOD OF PREVENTING UNAUTHENTICATED VIEWING USING UNIQUE INFORMATION OF SECURE MICRO

(75) Inventors: Young Ho Jeong, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 614 days.

This patent is subject to a terminal disclaimer.

(21) Appl. No.: 12/546,859

(22) Filed: Aug. 25, 2009

(65) Prior Publication Data

US 2010/0153710 A1    Jun. 17, 2010

(30) Foreign Application Priority Data

Dec. 16, 2008 (KR) .................. 10-2008-0127917

(51) Int. Cl.
*H04L 9/32* (2006.01)
*H04L 29/06* (2006.01)
*H04N 21/45* (2011.01)

(52) U.S. Cl.
CPC ......... *H04L 63/0876* (2013.01); *H04L 63/0884* (2013.01); *H04N 21/45* (2013.01)
USPC .................. 713/156; 713/155; 726/2; 726/30

(58) Field of Classification Search
CPC H04L 63/0876; H04L 63/0884; H04N 21/45; H04N 21/4516
USPC .................. 713/155–156; 726/2, 30
See application file for complete search history.

(56) References Cited

U.S. PATENT DOCUMENTS

| 6,246,767 | B1 * | 6/2001 | Akins et al. .................. 380/210 |
| 2006/0137015 | A1 * | 6/2006 | Fahrny et al. .................. 726/26 |
| 2008/0005326 | A1 | 1/2008 | Pinder et al. |
| 2008/0040419 | A1 | 2/2008 | Muth |
| 2008/0098212 | A1 * | 4/2008 | Helms et al. .................. 713/155 |
| 2008/0177998 | A1 * | 7/2008 | Apsangi et al. .................. 713/155 |
| 2008/0313463 | A1 | 12/2008 | Depietro et al. |

FOREIGN PATENT DOCUMENTS

| KR | 1020040050561 A | 6/2004 |
| KR | 10-0606748 B1 | 7/2006 |
| KR | 10-0732668 B1 | 6/2007 |

OTHER PUBLICATIONS

Jeong, Youngho et al. "A Novel Protocol for Downloadable CAS", Aug. 2008, http://ieeexplore.ieee.org/stamp/stamp.jsp?arnumber=04637612.*
Gratn of Patent by KIPO (The Korean Intellectual Property Office) for KR-10-2008-0127917, Apr. 19, 2012.*

* cited by examiner

Primary Examiner — Jung Kim
Assistant Examiner — Carlos M De Jesus, Jr.
(74) Attorney, Agent, or Firm — Ladas & Parry LLP

(57) ABSTRACT

A method of verifying a validity of a Secure Micro (SM) is provided. The method of verifying a validity of an SM, the method including: storing and maintaining a validity verification message used to verify the validity of the SM, the validity verification message being generated by a Trusted Authority (TA) based on unique information of the SM, and the SM and the TA sharing the unique information of the SM; and verifying the validity of the SM using the validity verification message and the unique information shared by the SM, when an SM client is executed.

19 Claims, 7 Drawing Sheets

METHOD OF PREVENTING UNAUTHENTICATED VIEWING USING UNIQUE INFORMATION OF SECURE MICRO

CROSS-REFERENCE TO RELATED APPLICATION

This application claims priority from Korean Patent Application No. 10-2008-0127917, filed on Dec. 16, 2008, in the Korean Intellectual Property Office, the entire disclosure of which is incorporated herein by reference.

BACKGROUND OF THE INVENTION

1. Field of the Invention

The present invention relates to a technology to prevent unauthenticated viewing even when a Secure Micro (SM) client is leaked.

2. Description of Related Art

When users desire to watch a specific program, a Conditional Access System (CAS) in cable networks determines whether to provide a service based on a user authentication and enables only an approved user to receive the program.

In a CAS in an initial stage, each manufacturing company uses standards different from each other, and thus a CAS is not compatible with other devices excluding a device of a particular company. Accordingly, a broadcasting service provider is required to directly provide a receiving terminal to a subscriber, which imposes a heavy burden on a broadcasting service provider and causes a difficulty in updating a CAS.

OpenCable has provided a standard separating a Conditional Access module from a subscriber terminal to overcome such a disadvantage, that is, to prevent a monopoly of manufacturing company, boost competition, and cause a decline in a product price. Accordingly, a CAS separated from a subscriber terminal is standardized as a cable card of a Personal Computer Memory Card International Association (PCMCIA) card type. Also, a broadcasting service provider provides a subscriber with only a cable card without lending a terminal to a subscriber, and thereby may provide a fee-based broadcasting service. However, an expected result of OpenCable has not been achieved due to an increase in a cable card price and management cost as well as failure in a retail market of terminals.

In such a circumstance, a technology related to a downloadable CAS (DCAS) is provided. The DCAS downloads a conditional access software to a subscriber terminal without a separate hardware conditional access module, and thereby enables a fee-based broadcasting service to be provided.

In a DCAS, a Secure Micro (SM) client may be downloaded and installed in an SM of a host. The SM client is required to be securely managed. When the SM client is leaked, a service provider may be damaged. Accordingly, technologies that may prevent a service from being used without authorization when an SM client is leaked are required.

SUMMARY OF THE INVENTION

The present invention provides a technology which may verify a validity of a Secure Micro (SM) using a validity verification message, provided to the SM in advance, when an SM client is executed, and thereby may efficiently prevent unauthenticated viewing.

The present invention also provides a technology which may generate a validity verification message using unique information, shared by an SM and a Trusted Authority (TA), of the SM, provide the validity verification message to the SM in advance, and thereby may easily verify a validity of the SM.

The present invention also provides a technology which may use a validity verification message including a digital signature generated using a private key of a TA, and thereby may reliably verify a validity of the SM.

According to an aspect of the present invention, there is provided a method of verifying a validity of an SM, the method including: storing and maintaining a validity verification message used to verify the validity of the SM, the validity verification message being generated by a TA based on unique information of the SM, and the SM and the TA sharing the unique information of the SM; and verifying the validity of the SM using the validity verification message and the unique information shared by the SM, when an SM client is executed.

In an aspect of the present invention, the verifying includes: parsing the validity verification message and extracting the unique information of the SM from the validity verification message; and comparing the unique information, extracted from the validity verification message, with the unique information shared by the SM.

In an aspect of the present invention, the validity verification message may include a digital signature, generated using a private key of the TA, and the unique information shared by the TA. Also, the SM client may obtain a public key of the TA in advance to verify the digital signature, and the verifying may verify, using the public key of the TA, the digital signature to verify the validity of the SM.

According to an aspect of the present invention, there is provided an operation method of a TA, the operation method including: receiving a request for a validity verification message from an SM, the validity verification message being used to verify a validity of the SM; generating the validity verification message using unique information of the SM, the SM and the TA sharing the unique information of the SM; and transmitting the validity verification message to the SM. The SM or an SM client may verify, using the validity verification message and the unique information shared by the SM, the validity of the SM, when the SM client is executed.

According to an aspect of the present invention, there is provided an SM, including: a memory to store a validity verification message provided from a TA in response to a request from the SM, the validity verification message including a digital signature and unique information of the SM, and the SM and the TA sharing the unique information of the SM; an extractor to parse the validity verification message and extract the digital signature and the unique information of the SM from the validity verification message; and a validity verifier to verify a validity of the SM using the digital signature and the unique information of the SM.

According to an embodiment of the present invention, a disclosed technology may verify a validity of an SM using a validity verification message, provided to the SM in advance, when an SM client is executed, and thereby may efficiently prevent unauthenticated viewing.

Also, according to an embodiment of the present invention, a technology may generate a validity verification message using unique information, shared by an SM and a TA, of the SM, provide the validity verification message to the SM in advance, and thereby may easily verify a validity of the SM.

Also, according to an embodiment of the present invention, a disclosed technology may use a validity verification message including a digital signature generated using a private key of a TA, and thereby may reliably verify a validity of the SM.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
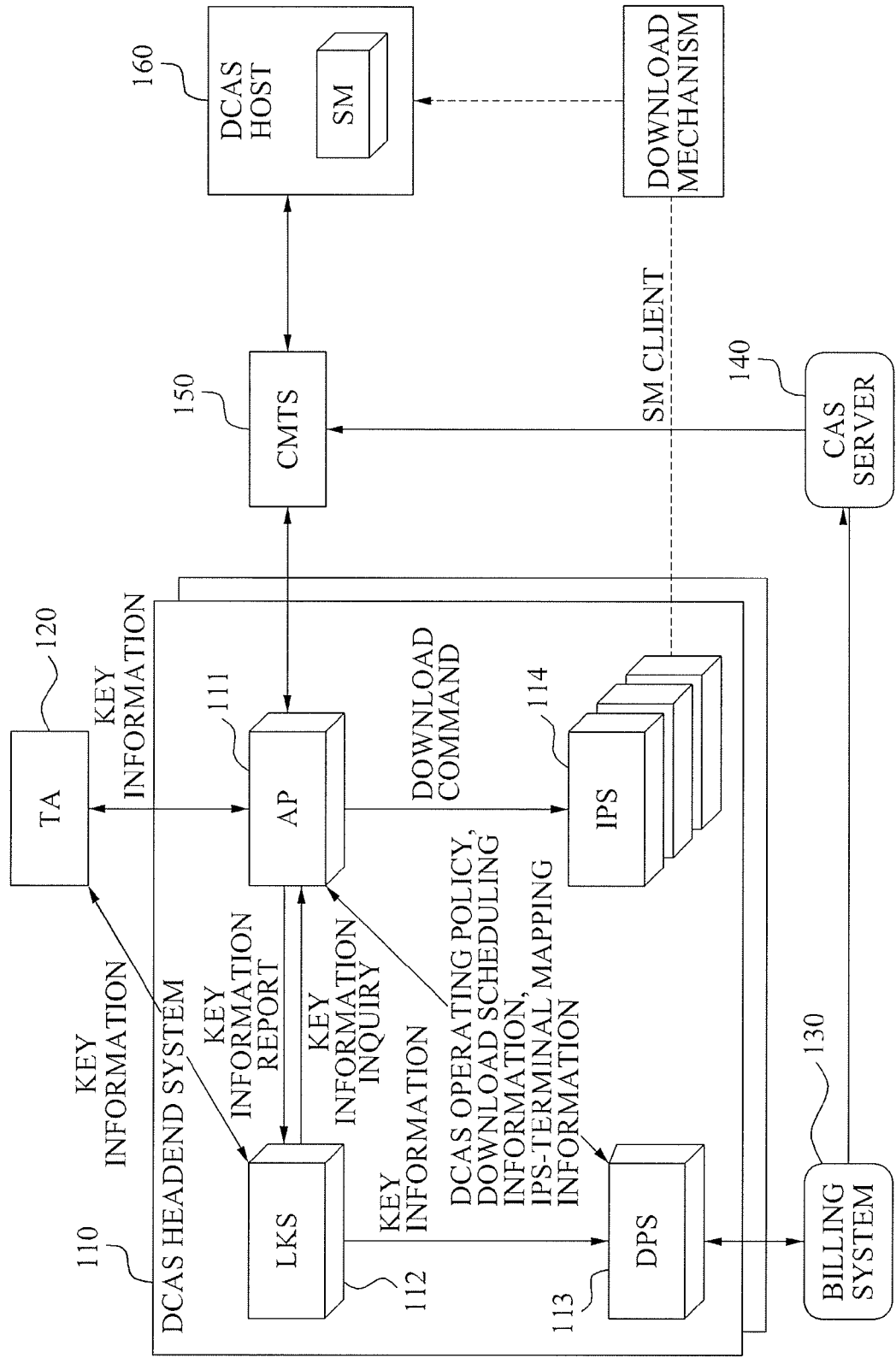
FIG. 1 is a block diagram illustrating a Downloadable Conditional Access System (DCAS) according to an embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating a Downloadable Conditional Access System (DCAS) according to an embodiment of the present invention.

Referring to FIG. 1, a headend system 110 for a conditional access service may include an Authentication Proxy (AP) server 111, a Local Key Server (LKS) 112, a Downloadable Conditional Access System Provisioning Server (DPS) 113, and an Integrated Personalization System (IPS) server 114.

The headend system 110 may be installed separately from an existing Conditional Access System (CAS) server 140. Also, the headend system 110 may be operated independently from the CAS server 140, and thereby may be compatible with an existing cable broadcasting system.

The LKS 112 may store and manage information about keys of servers, such as a key of a Secure Micro (SM), a history of identification (ID) information of the SM, a key of the AP server 111, a history of ID information of the AP server 111, and a history of key information of the IPS server 114.

Also, the DPS 113 may determine a download policy and a policy associated with a DCAS service, and manage information associated with the policies, hereinafter referred to as 'download-related information' or 'download policy-related information'.

Also, the IPS server 114 may store and manage an SM client to be downloaded to a DCAS host 160.

When a DCAS host 160 connected to a cable network exists, the AP server 111 may transmit information associated with an SM of the DCAS host 160 to a Trusted Authority (TA) 120 to authenticate the DCAS host 160. The TA 120 may be a reliable external authentication device. The TA 120 may authenticate the DCAS host 160 using the received information associated with the SM.

The AP server 111 may receive the download-related information or the download policy-related information from the DPS 113. The download-related information or the download policy-related information may include information associated with a connection (mapping) between the IPS server 114 and DCAS host 160, information associated with a download scheme of the SM, information associated with a DCAS operating policy, and download scheduling information.

In this instance, the AP server 111 may command the IPS server 114 to perform a process to download the SM client based on the download-related information or the download policy-related information. The IPS server 114 may perform the process to download the SM client according to a download scheme corresponding to download-related information or download policy-related information selected by the DPS 113 from a plurality of download schemes. The plurality of download schemes may correspond to a variety of transfer protocols such as a Carousel, Trivial File Transfer Protocol (TFTP), Hyper-Text Transfer Protocol (HTTP), and the like.

When an authentication of the DCAS host 160 is completed, the DCAS host 160 may download and install the SM client in the SM of the DCAS host 160. The DPS 113 may report, to the CAS server 140, about an access of the authenticated DCAS host 160 to a program through a billing system 130. In this instance, the CAS server 140 may transmit an Entitlement Management Message (EMM) to the DCAS host 160 through a Cable Modem Termination System (CMTS) 150.

The SM client downloaded and installed in the SM of the DCAS host 160 may extract a code word using the received EMM through a CAS messages processing operation. Also, the SM client may transmit the extracted code word to a Transport Processor (TP). The TP may decode the received encrypted program using the code word.

Figure 2:
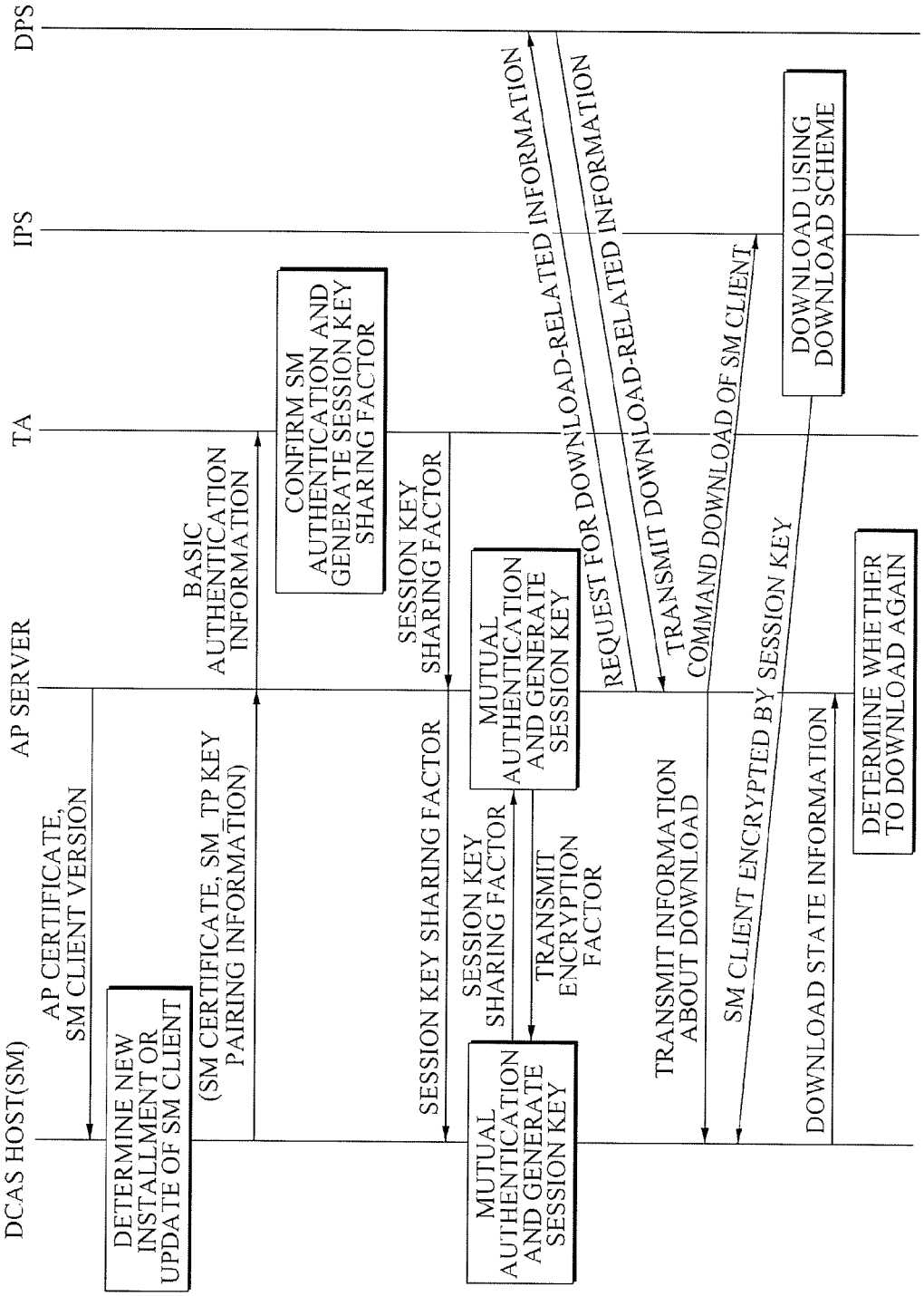
FIG. 2 is a flowchart illustrating operations of entities in a DCAS according to an embodiment of the present invention.

FIG. 2 is a flowchart illustrating operations of entities in a DCAS according to an embodiment of the present invention.

Referring to FIG. 2, an AP server may continuously transmit a certificate of the AP server and SM client version information to a DCAS host via a DCAS network protocol interface. The certificate of the AP server and SM client version information, of a currently operated SM client, may be used to determine whether downloading of an SM client is necessary.

The certificate of the AP server may be used to authenticate a message received from the AP server by the DCAS host, and to confirm an identity of the AP server.

The DCAS host connected to a DCAS network may determine whether to newly install or update the SM client using the received SM client version information. When the SM client is determined to be newly installed or updated, the DCAS host may transmit basic authentication information to the AP server.

The basic authentication information may include information associated with a key pairing of a TP and an SM, a certificate of the SM, and the like. The certificate of the SM may be used when the AP server authenticates a message received from the DCAS host and confirms an identity of the DCAS host.

The AP server may transmit the basic authentication information to the TA, and the TA may authenticate the SM. When the authentication of the SM is completed, the AP server may generate a session key sharing factor, and transmit the generated session key sharing factor to the AP server.

The AP server may share the session key sharing factor with the DCAS host. The AP server and the DCAS host sharing the session key sharing factor may perform a mutual authentication. When the authentication is completed, each session key may be generated. The session key may be used to encrypt or decrypt a DCAS message and SM client.

The AP server may request a DPS for download-related information or download policy-related information. The download-related information or the download policy-related information may include information associated with a connection (mapping) between an IPS server and the DCAS host, information associated with an address of the IPS server, and information associated with a download scheme or a name of the SM client. The AP server may transmit the download-related information or the download policy-related information to the DCAS host.

The AP server may command the IPS server to perform a process to download the SM client according to a download scheme. The IPS server may perform the process to download the SM client according to the selected download scheme. In this instance, the downloaded SM client may be encrypted using a session key.

The DCAS host may transmit download state information to the AP server based on whether the SM client is normally downloaded. The AP server may determine whether the SM client is to be downloaded again based on the received download state information. When it is determined that the SM client is to be downloaded again, the AP server may perform a process to download the SM client again.

In this instance, unencrypted SM clients may be transmitted/received between the DPS and the IPS server. When the SM clients are leaked to an outside, a service provider may suffer a loss. Accordingly, even when SM clients are leaked, unauthenticated service use is to be prevented, which is described in detail below.

Figure 3:
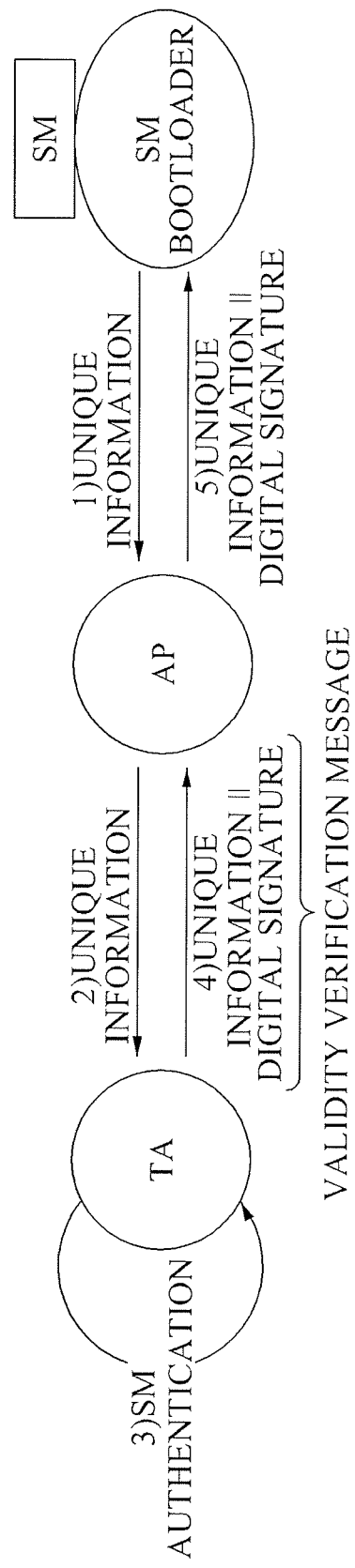
FIG. 3 is a conceptual diagram illustrating that a Trusted Authority (TA), an Authentication Proxy (AP) server, and a Secure Micro (SM) transmit/receive messages according to an embodiment of the present invention.

FIG. 3 is a conceptual diagram illustrating that a TA, an AP server, and an SM transmit/receive messages according to an embodiment of the present invention.

Referring to FIG. 3, in step 1, the SM may transmit unique information to the AP server to be provided with a validity verification message. The unique information may identify the SM, and the SM and the TA may share the unique information. For example, the unique information may be information such as 'Key_Pairing_ID' including an ID of the SM. 'Key_Pairing_ID' may be a value obtained by concatenating an ID of a descrambler chip and the SM.

In step 2, the AP server may transmit the unique information, transmitted from the SM, to the TA. In step 3, the TA may authenticate the SM using the unique information transmitted from the AP server. In step 4, the TA may generate the validity verification message used to verify a validity of the SM. The validity verification message may include the unique information and a digital signature, and "||" may indicate concatenation. In step 5, the AP server may transmit the validity verification message to the SM.

Also, the SM or an SM client may extract unique information from the validity verification message, and determine the validity of the SM depending on whether the unique information, shared by the SM, is identical to the extracted unique information.

Specifically, when the SM client is executed, the SM bootloader may transmit the validity verification message to the SM client. In this instance, it may be determined whether the SM client may be continuously executed, based on the unique information extracted from the validity verification message.

However, the SM client may not completely verify whether particular unique information is extracted from the validity verification message generated by the TA, since the SM bootloader may imitate a message, which is not generated by the TA, as the validity verification message generated by the TA.

Accordingly, the validity verification message may include a digital signature generated using a private key of the TA. That is, the SM client may obtain a public key of the TA in advance, and verify the digital signature using the public key. Thus, the SM client may verify whether particular unique information is extracted from the validity verification message generated by the TA.

Figure 4:
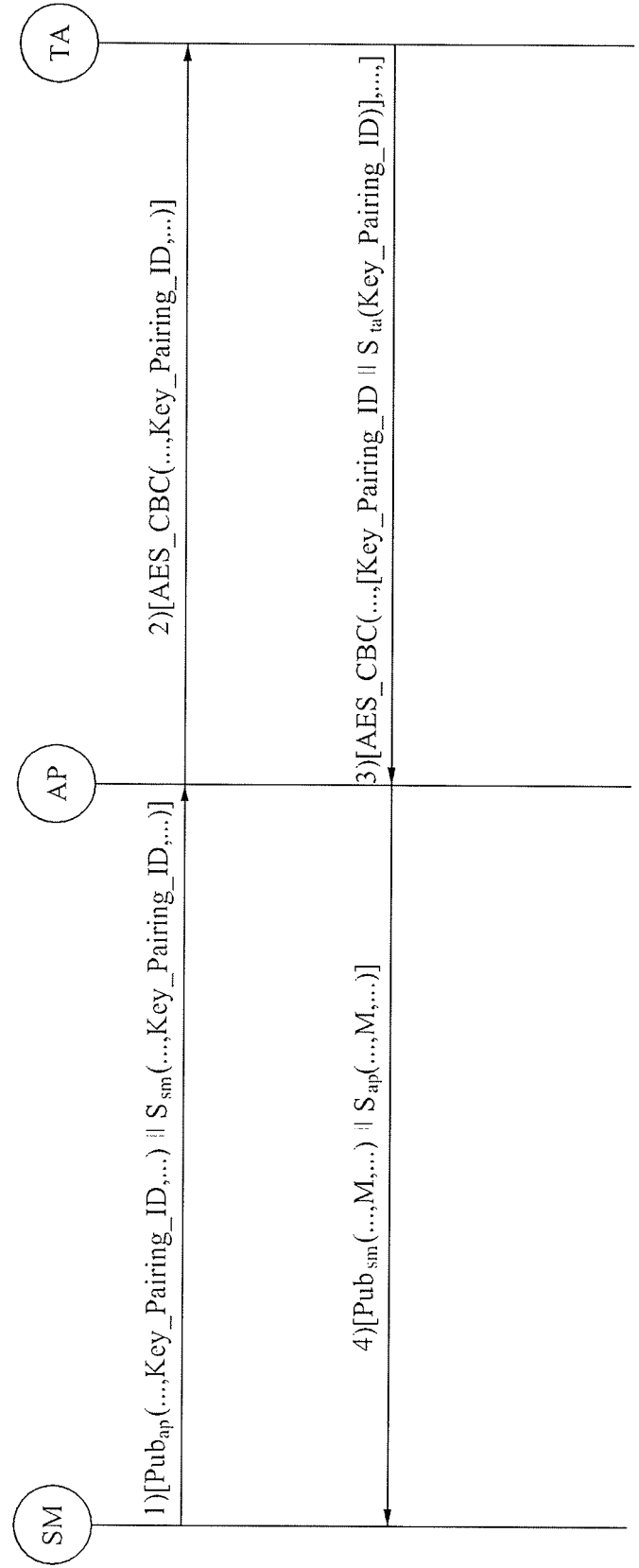
FIG. 4 is a diagram illustrating operations of generation and transmission of a validity verification message according to an embodiment of the present invention.

FIG. 4 is a diagram illustrating operations of generation and transmission of a validity verification message according to an embodiment of the present invention.

Referring to FIG. 4, in step 1, an SM may transmit a request for the validity verification message to a TA through an AP server. The request may include unique information and a digital signature of the SM. The unique information may be assumed as 'Key_Pairing_ID'.

That is, in step 1, the SM may encrypt 'Key_Pairing_ID' and other information using a public key of the AP server, and generate 'Pub$_{ap}$( . . . , Key_Pairing_ID, . . . )'. The SM may sign the digital signature with respect to 'Key_Pairing_ID' using a private key of the SM, and generate 'S$_{sm}$( . . . , Key_Pairing_ID, . . . )'. Also, the SM may concatenate 'Pub$_{ap}$( . . . , Key_Pairing_ID, . . . )' with 'S$_{sm}$( . . . , Key_Pairing_ID, . . . )', and transmit the concatenated information to the AP server.

In step 2, the AP server may verify the digital signature 'S$_{sm}$( . . . , Key_Pairing_ID, . . . )' using a public key of the SM, decrypt 'Pub$_{ap}$( . . . , Key_Pairing_ID, . . . )' using a private key of the AP server, and thereby may obtain 'Key_Pairing_ID'. Also, the AP server may encrypt 'Key_Pairing_ID' according to an Advanced Encryption Standard Cipher Block Chaining (AES-CBC) scheme, and thereby may transmit the encrypted information to the TA.

In step 3, the TA may decrypt '[AES_CBC( . . . , Key_Pairing_ID, . . . )]', and extract 'Key_Pairing_ID'. The TA may sign a digital signature with respect to 'Key_Pairing_ID' using a private key of the TA, concatenate 'Key_Pairing_ID' with a digital signature 'S$_{ta}$(Key_Pairing_ID)', and thereby may generate a validity verification message '[Key_Pairing_ID||S$_{ta}$(Key_Pairing_ID)]=M'. Also, the TA may encrypt the validity verification message M according to the AES-CBC scheme, and transmit '[AES-CBC( . . . , M, . . . )]' to the AP server.

In step 4, the AP server may extract the validity verification message M from '[AES-CBC( . . . , M, . . . )]', encrypt the validity verification message M using the public key of the SM, and sign a digital signature with respect to the validity verification message M using the private key of the AP server. Also, the AP server may transmit '[Pub$_{sm}$( . . . , M, . . . )||S$_{ap}$( . . . , M, . . . )]' to the SM.

Also, the SM may store the validity verification message M in a memory, and provide an SM client with the validity verification message M, when the SM client is executed. In this instance, the SM client may parse the validity verification message M, extract the unique information 'Key_Pairing_ID' and the digital signature 'S$_{ta}$(Key_Pairing_ID)', and verify the digital signature 'S$_{ta}$(Key_Pairing_ID)' using a previously provided public key of the TA. When the digital signature 'S$_{ta}$(Key_Pairing_ID)' is verified, the SM client may verify a validity of the SM depending on whether 'Key_Pairing_ID', extracted from the validity verification message M, is identical to 'Key_Pairing_ID' transmitted from the SM.

Figure 5:
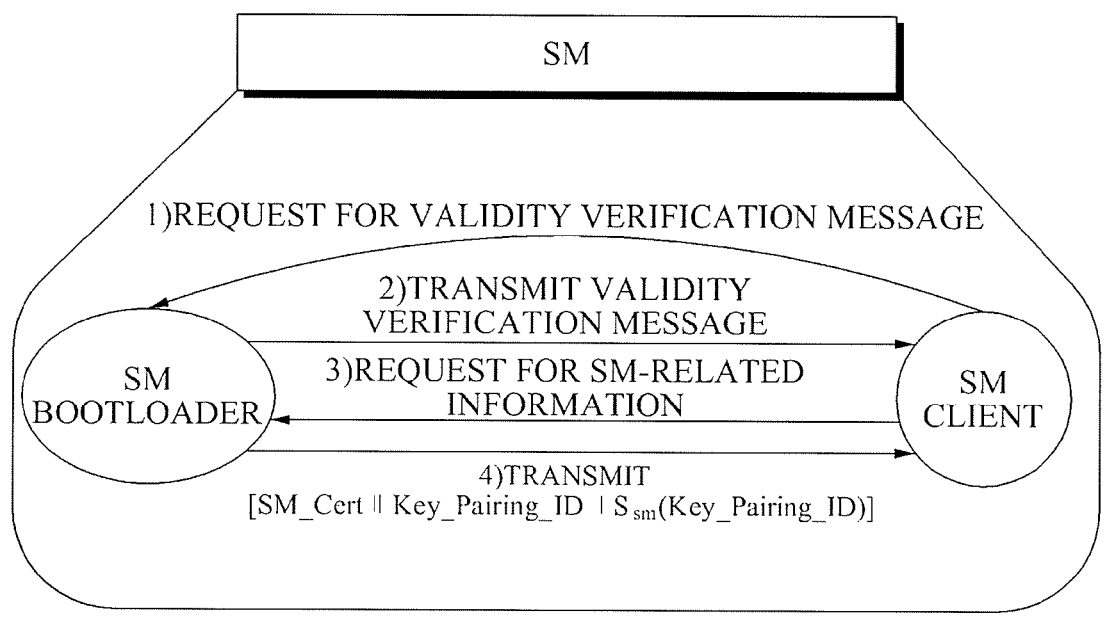
FIG. 5 is a diagram illustrating an operation where an SM bootloader and an SM client verify a validity of an SM using a validity verification message according to an embodiment of the present invention.

FIG. 5 is a diagram illustrating an operation where an SM bootloader and an SM client verify a validity of an SM using a validity verification message according to an embodiment of the present invention.

Referring to FIG. 5, in step 1, when the SM bootloader executes the SM client, the SM client may request the validity verification message.

In step 2, the SM bootloader may provide the SM client with the validity verification message transmitted from a TA and stored in a memory. The validity verification message may include unique information and a digital signature.

In step 3, the SM client may request SM-related information including unique information included in the SM.

In step 4, the SM bootloader may transmit, to the SM client, '[SM_Cert||Key_Pairing_ID||$S_{sm}$(Key_Pairing_ID)]' as the SM-related information. 'SM_Cert' may indicate a certificate of the SM, and '$S_{sm}$(Key_Pairing_ID)' may indicate a digital signature where a private key of the SM is used. Also, the SM client may verify the certificate of the SM 'SM_Cert', verify the digital signature '$S_{sm}$(Key_Pairing_ID)' using an extracted public key of the SM, and thereby may obtain the unique information 'Key_Pairing_ID' included in the SM.

Finally, the SM client may determine whether 'Key_Pairing_ID' extracted from the validity verification message is identical to 'Key_Pairing_ID' extracted from '[SM_Cert||Key_Pairing_ID||$S_{sm}$(Key_Pairing_ID)]', and thereby may verify the validity of the SM.

Figure 6:
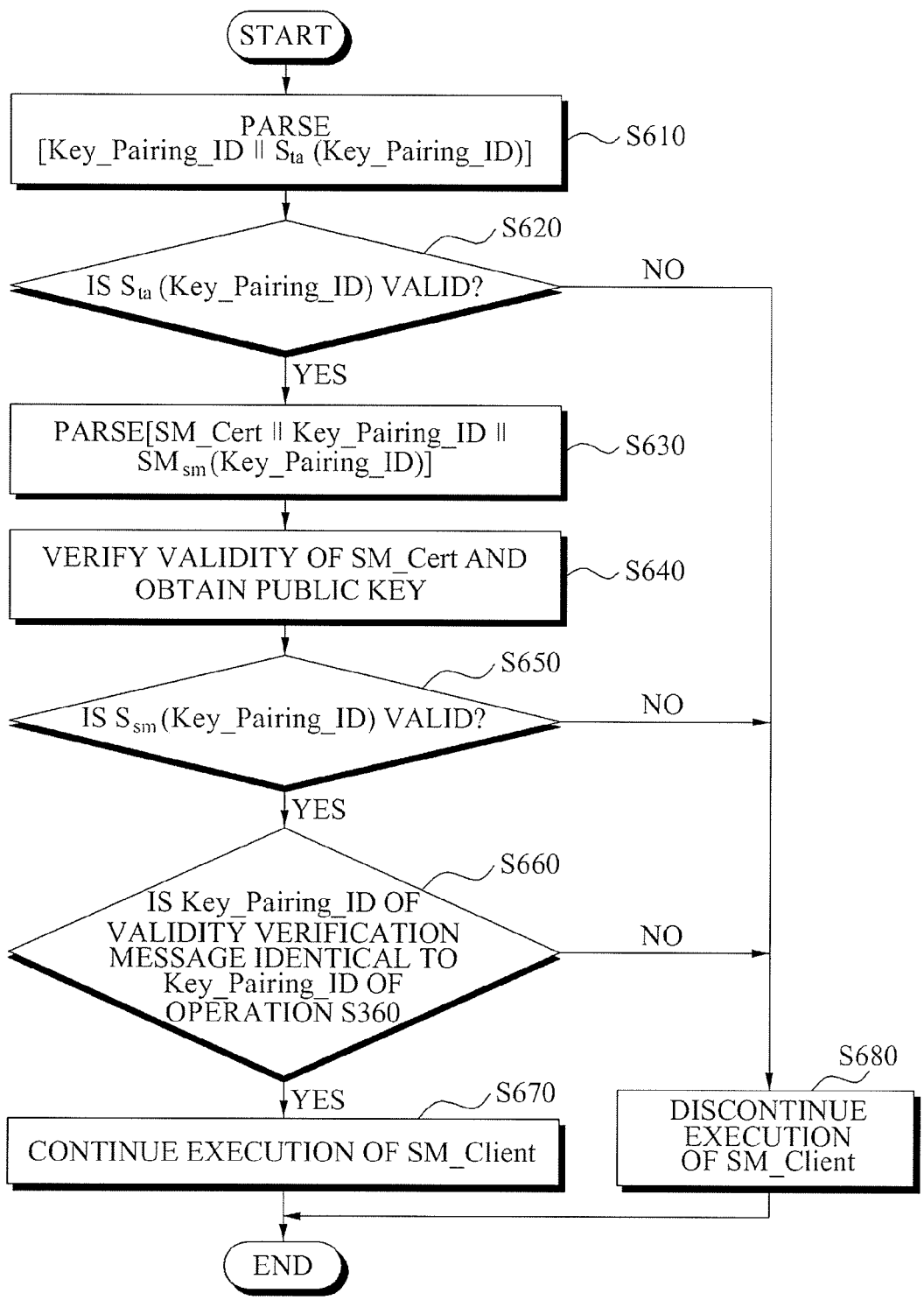
FIG. 6 is a flowchart illustrating a method of verifying a validity of an SM according to an embodiment of the present invention.

FIG. 6 is a flowchart illustrating a method of verifying a validity of an SM according to an embodiment of the present invention.

Referring to FIG. 6, when an SM client is executed, the SM client may parse a validity verification message '[Key_Pairing_ID||$S_{ta}$(Key_Pairing_ID)]', and extract 'Key_Pairing_ID' and '$S_{ta}$(Key_Pairing_ID)' in operation S610. The validity verification message '[Key_Pairing_ID||$S_{ta}$(Key_Pairing_ID)]' may be provided from a TA, and stored in a memory.

In operation S620, the SM client may determine whether the digital signature '$S_{ta}$(Key_Pairing_ID)' is valid using a public key of the TA. The SM client may obtain the public key of the TA in advance.

When the digital signature '$S_{ta}$(Key_Pairing_ID)' is not valid, the execution of the SM client may be discontinued in operation S680. When the digital signature '$S_{ta}$(Key_Pairing_ID)' is valid, the SM client may parse '[SM_Cert||Key_Pairing_ID||$S_{sm}$(Key_Pairing_ID)]' generated by an SM bootloader in operation S630.

In operation S640, the SM client may verify a validity of a certificate of the SM, 'SM_Cert', and obtain a public key of the SM to verify a digital signature of the SM, '$S_{sm}$(Key_Pairing_ID)'.

In operation S650, the SM client may determine whether the digital signature '$S_{sm}$(Key_Pairing_ID)' is valid using the public key of the SM. In this instance, when the digital signature '$S_{sm}$(Key_Pairing_ID)' is not valid, the execution of the SM client may be discontinued in operation S680.

However, in operation S660, when the digital signature '$S_{sm}$(Key_Pairing_ID)' is valid, the SM client may determine whether 'Key_Pairing_ID' extracted from 'Key_Pairing_ID||$S_{ta}$(Key_Pairing_ID)' is identical to 'Key_Pairing_ID' extracted from '[SM_Cert||Key_Pairing_ID||$S_{sm}$(Key_Pairing_ID)].

In operation S670, when the two 'Key_Pairing_ID' are identical, the SM client may continue the execution.

The method of verifying a validity of an SM according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 7:
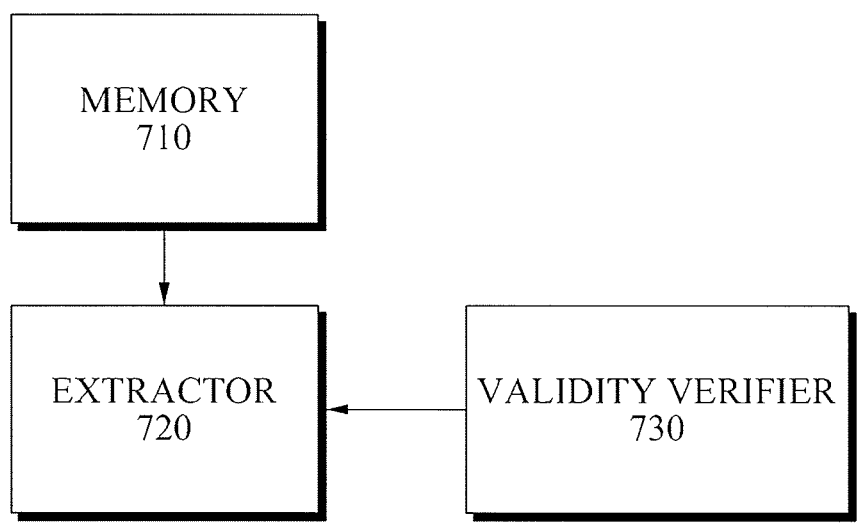
FIG. 7 is a block diagram illustrating an SM according to an embodiment of the present invention.

FIG. 7 is a block diagram illustrating an SM 700 according to an embodiment of the present invention.

Referring to FIG. 7, the SM 700 may include a memory 710, an extractor 720, and a validity verifier 730.

The memory 710 may store a validity verification message provided from a TA in response to a request from the SM 700. The validity verification message may include a digital signature and unique information of the SM 700, and the SM 700 and the TA may share the unique information of the SM 700. The digital signature may be generated using a private key of the TA.

The extractor 720 may parse the validity verification message in response to an execution of an SM client, and extract the digital signature and the unique information of the SM from the validity verification message.

The validity verifier 730 may verify a validity of the SM using the digital signature and the unique information extracted from the validity verification message. Particularly, the validity verifier 730 may verify the validity of the SM depending on whether the unique information, extracted from the validity verification message, is identical to the unique information shared by the SM. Also, the validity verifier 730 may verify the validity of the SM by verifying the digital signature using a public key of the TA. The public key of the TA may be included in the SM client.

Further detailed descriptions will be omitted herein, since each of the memory 710, the extractor 720, and the validity verifier 730 illustrated in FIG. 7 may correspond to the descriptions described with reference to FIGS. 1 and 6.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of verifying a validity of a Secure Micro terminal (SM), the method comprising:

storing and maintaining, at the SM, a validity verification message used to verify the validity of the SM, the validity verification message being generated by a Trusted Authority device (TA) based on unique information of the SM, and the SM and the TA sharing the unique information of the SM, wherein the unique information of the SM includes a Key_Pairing_ID that includes an identification (ID) of the SM, and wherein Key_Pairing_ID is a value obtained by concatenating an ID of a descrambler chip of the SM and the ID of the SM;

verifying, at the SM, the validity of the SM using the validity verification message and the unique information shared in the SM including the Key_Pairing_ID, when an SM client is installed; and requesting the validity verification message, wherein the TA generates a digital signature using a private key of the TA in response to the request, and provides the SM with the validity verification message including the digital signature and the unique information of the SM, and wherein the SM obtains a public key of the TA to verify the digital signature.

2. The method of claim 1, wherein the validity verification message includes the digital signature and the unique information shared by the TA, the digital signature being generated using the private key of the TA.

3. The method of claim 1, wherein the verifying comprises:
parsing the validity verification message and extracting the unique information of the SM from the validity verification message; and
comparing the unique information, extracted from the validity verification message, with the unique information shared by the SM.

4. The method of claim 3, wherein the verifying further comprises:
determining the validity of the SM depending on whether the unique information, extracted from the validity verification message, is identical to the unique information shared by the SM.

5. The method of claim 4, wherein the unique information shared by the SM is obtained by verifying at least one of a certificate of the SM and a digital signature of the SM.

6. The method of claim 4, wherein the SM client obtains the public key of the TA in advance to verify the digital signature, and
the verifying verifies, using the public key of the TA, the digital signature to verify the validity of the SM.

7. The method of claim 1, wherein the validity verification message includes the digital signature, generated using the private key of the TA, and also includes the unique information shared by the TA, and
the verifying verifies the validity of the SM using the digital signature and the unique information included in the validity verification message.

8. The method of claim 1, wherein the validity verification message is provided to the SM from the TA through an Authentication Proxy (AP) server, and wherein the AP transmits a session key sharing factor to a downloadable conditional access system hosting the SM.

9. The method of claim 1, wherein the verifying is performed every time the SM client is executed.

10. The method of claim 1 further comprising verifying the validity of the SM using the validity verification message and the unique information shared in the SM, when the SM client is updated.

11. An operation method of a trusted authority device (TA), the operation method comprising:
receiving a request for a validity verification message from a secure micro terminal (SM), the validity verification message being used to verify a validity of the SM;
generating the validity verification message using unique information of the SM, the SM and the TA sharing the unique information of the SM, wherein the unique information of the SM includes a Key_Pairing_ID, wherein the Key_Pairing_ID is a value obtained by concatenating an ID of a descrambler chip of the SM and an ID of the SM, and wherein the validity verification message includes a digital signature generated using a private key of the TA; and
transmitting the validity verification message to the SM, wherein the SM or an SM client verifies, using the validity verification message and the unique information shared by the SM, the validity of the SM when the SM client is installed.

12. The operation method of claim 11, wherein the generating comprises:
generating the digital signature using the private key of the TA,
wherein the validity verification message includes the digital signature and the unique information shared by the TA.

13. The operation method of claim 12, wherein the SM client obtains a public key of the TA in advance to verify the digital signature, and
the SM or the SM client verifies, using the public key of the TA, the digital signature to verify the validity of the SM.

14. The operation method of claim 11, wherein the SM or the SM client parses the validity verification message to extract the unique information of the SM from the validity verification message, and compares the unique information, extracted from the validity verification message, with the unique information shared by the SM to verify the validity of the SM.

15. The operation method of claim 11, wherein the receiving receives the request from the SM through an AP server, and the transmitting transmits the validity verification message to the SM through the AP server.

16. A Secure Micro terminal (SM), comprising:
a memory to store a validity verification message provided from a Trusted Authority device (TA) in response to a request from the SM, the validity verification message including a digital signature and unique information of the SM, and the SM and the TA sharing the unique information of the SM, wherein the unique information of the SM includes a Key_Pairing_ID that includes an identification (ID) of the SM, and wherein Key_Pairing_ID is a value obtained by concatenating an ID of a descrambler chip of the SM and the ID of the SM;
an extractor to parse the validity verification message and extract the digital signature and the unique information of the SM from the validity verification message; and
a validity verifier to verify a validity of the SM using the digital signature and the unique information of the SM when a secure micro client is installed in the SM.

17. The SM of claim 16, wherein the validity verifier verifies the validity of the SM based on whether the unique information, extracted from the validity verification message, is identical to the unique information shared by the SM.

18. The SM of claim 16, wherein the TA generates the digital signature using a private key of the TA.

19. The SM of claim 18, wherein the validity verifier verifies, using a public key of the TA, the digital signature to verify the validity of the SM, the validity verifier obtaining the public key in advance.

* * * * *